United States Patent Office 3,400,090
Patented Sept. 3, 1968

3,400,090
SEALING COMPOSITIONS COMPRISING HALOGENATED BUTYL RUBBER, DRYING OIL AND LIQUID POLYISOBUTYLENE
Philip H. Maslow, Brooklyn, N.Y., assignor to W. R. Grace & Co., Cambridge, Mass., a corporation of Connecticut
No Drawing. Filed Nov. 9, 1964, Ser. No. 409,957
4 Claims. (Cl. 260—23.7)

ABSTRACT OF THE DISCLOSURE

A caulking composition which is composed of a halogenated rubbery copolymer of a major amount of isobutylene and a minor amount of a diolefin, such as isoprene, a drying oil, such as linseed oil, and liquid polyisobutylene. The composition may be modified by the inclusion of various additives to impart certain properties, such as fillers and pigments.

---

This invention relates to sealants and in a particular aspect it relates to rubber-based compositions for sealing joints in masonry and other types of construction.

Sealing or caulking compositions are used for filling certain joints in masonry and in other construction work. They are intended to remain sufficiently pliable to yield and maintain a seal in joints that vary in width to such an extent as to render the use of mortar or other joint filler impracticable. This seal may be against water, oil, or other liquids, or it may be intended to prevent the passage of air, water vapor, solvent vapors or other gases. In many cases, the caulking materials are applied after the completion of the structure, while in others they may be applied before or during construction.

The oldest type of mastic caulking composition has been made with semidrying oil media having a vehicle which does not harden readily and eventually fall out of the joint. Compositions presently available perform satisfactorily for a number of years but then become less reliable because they develop weak cohesive strength and low elongation. These compositions merely form a surface skin within the first few days of exposure and some even remain wet beneath the skin surface for several years. Although it is known to modify such oil-based compounds with a nondrying polyisobutylene to improve their properties, they are, nevertheless, still subject to substantially the same deficiencies as the straight semidrying products.

The commercially-available sealants, such as the butyl rubber types or those based on fully polymerized resins, such as polychloroprene and chlorosulfonated polyethylene, generally carry about 11 to 20% of volatile matter and are effective in relatively narrow joints of the order of about ⅛ to ¼ inch in width. In sealing joints of these widths, the high volatile content does not cause the sealant to shrink to such an extent as to leave portions of the joint unfilled or with an insufficient amount of composition. However, in masonry construction, especially where precast sections are used and in some curtain wall specification joints, the space is greater than ¼ inch and it is not infrequent that joint spaces up to 1 inch exist. For these applications, it is essential to maintain the volatile content as low as possible. Actually zero volatile content would be ideal but it is rarely obtainable in a composition that will have satisfactory application properties.

It has been discovered that shrinkage effects in wide joints do not induce a break in the continuity of the sealant so long as the volatile content is not in excess of 10%. In addition, it has been discovered that a full cure of the vehicle component is not essential in wide joints. This invention, therefore, provides a sealing composition for wide joints having properties intermediate those of a true elastomeric sealant and a semidrying oil-based caulking composition.

The composition of this invention is comprised of a halogenated butyl rubber, a drying oil, and a nonreactive plasticizer. The volatile matter of the composition of this invention does not exceed 10% and is slow curing. After exposure in a joint for 3 to 4 weeks under normal atmospheric conditions, the Shore A Durometer reading reaches an average value of approximately 10 and will rise to about 25 within a year. Further development will continue very slowly over several years until a maximum Shore A hardness of approximately 35 is reached. This compound is soft and requires little effort to apply to a joint. Moreover, the tendency for elastomeric stringiness, when handled, is negligible.

Butyl rubber is produced by coreacting a monoolefin, such as isobutylene, with a diolefin, such as isoprene and butadiene. The monoolefin predominates and it is usual to have the diolefin present in amounts up to about 5% by weight. If this copolymer is reacted with a halogen, such as fluorine, chlorine, or bromine, it has been found that the properties of the sealant are vastly improved. When applied to joints, it will cure to a certain extent throughout the mass and thereby provide desirable cohesive properties and also develop elastic-recovery properties that are lacking in the unhalogenated polymer.

Halogenation permits compounding of the sealant in a single sealed package which on exposure develops further polymerization activity. Vulcanization of the rubber proceeds at normal temperature and pressure without the use of high heat or strong catalysts which are generally resorted to with the unhalogenated butyl rubber compositions. Halogenation adds at some of the unsaturation points but some substitution also occurs. The extent of halogenation is such as to avoid eliminating all unsaturation sites. This allows a degree of vulcanization to occur with the activity of the residual double bonds or through the reactive halogen or by both methods. It has been observed that a halogenated butyl rubber vulcanizes at normal climatic temperature even with a single package composition and it remains unreactive until a bead is applied and the material is exposed to light and the atmosphere.

The halogenated butyl rubber is produced by reacting the unvulcanized butyl rubber with a halogen, such as chlorine, bromine or halogen-containing compounds, so that the polymer contains at least 1.0 weight percent of combined halogen but not more than 1.5 weight percent, preferably between about 1.0 and 1.3 weight percent, of halogen in the polymer.

According to this invention, some degree of crosslinking occurs between the halogenated butyl rubber and the unsaturated oil at atmospheric conditions. The high content of unreactive plasticizer prevents the unsaturated oil from copolymerizing or self-polymerizing. It has been noted that the composition shows activity throughout the mass of an applied bead within 3 to 4 weeks and that the Shore A Durometer reading is about 10 within this period. At the same time it has been observed that desirable resilient and elastic qualities have developed.

One possible explanation for vulcanization at ordinary temperatures is that the halogenated butyl rubber absorbs light photon radiation near the double bond which momentarily raises its energy level and then it disassociates into reactive free macro radicals. These radicals can induce side reactions which probably lead to branching or cross-linking and thus to vulcanization. It is also believed that atmospheric oxygen plays a part in reactivating this process because it is known that a halogenated polymer can be polymerized further by means of oxidizing agents, such as quinone dioxime and zinc peroxide.

The drying oils which are employed in the composition of this invention include both natural and synthetic liquid substances that are converted by the action of oxygen of the air to a dry, hard resinous material. These include the naturally-occurring fatty oils, such as vegetable and fish oils, which consists chiefly of triglycerides of a relatively high degree of unsaturation, and synthetic unsaturated hydrocarbon polymers of the non-glyceride type. The naturally-occurring oils include linseed, soybean, tung, castor, dehydrated castor, oiticica, perilla, safflower, menhaden, pilchard and sardine. Polybutadiene is representative of the unsaturated hydrocarbon synthetic oils. The conversion of the composition containing the drying oil from the liquid to the solid state involves the absorption of oxygen which continues after the solid is formed. The oxidative process induces polymerization which in turn converts the composition from a liquid to a solid. Oil-soluble metallic soaps are employed to catalyze the oxidation reaction. Representative soaps include aluminum, calcium, cobalt, iron lead, manganese, and zinc linoleates, naphthenates, and resinates.

The plasticizers employed in the compositions of this invention are nonreactive and are considered external plasticizers in that they do not enter into any chemical reaction with the other ingredients. They include essentially saturated materials of low polarity, such as hydrocarbon oils, higher aliphatic esters, aromatic esters, certain resins including those derived from alkylated phenols, terpenes and hydrogenated ester gum, and epoxidized oils of fatty acids. Illustrative plasticizers include, acetylated castor oil, n-butyl acetyl polyricinoleate, and epoxidized triglycerides of vegetable oil fatty acids, such as epoxidized soybean oil and epoxidized castor oil. The most suitable plasticizer has been found to be polyisobutylene.

The sealing composition is modified by including various additives to impart certain properties. Fillers, such as talc, asbestine, asbestos fibers and silica flour, are added for bulk and to develop the proper rheological properties. Pigments, whose main function is color, such as zinc oxide, titanium dioxide, iron oxide, and chromium oxide should be used in amounts only necessary to obtain the desired color. Excessive amounts of the color pigments may harden the composition and increase the cost unnecessarily.

The components may be combined in any type of equipment that permits mixing of sufficient rigor to wet all particles, break up large agglomerates and to secure and maintain a homogeneous mixture.

A commercial butyl rubber having a molecular weight of about 40,000 was combined with 1.2 percent by weight of bromine. The rubber was made by cold polymerization of isobutylene and 2 percent isoprene in the presence of a Friedel-Crafts type catalyst. It is noted that the amount of bromine added was less than the amount of isoprene contained in the copolymer. This yielded a polymer having unsaturated sites which are available for vulcanization. The polymer was reduced to a 50 percent by weight cut-back in petroleum distillate using a heavy duty Banbury Mixer. To this there was then blended a drying oil and a liquid polyisobutylene was included as a plasticizer. Pigments and fillers were then compounded into the mastic to develop the necessary rheological properties so that the compound would stay fixed and not run out when applied to vertical or overhead joints.

When this mastic was filled into sealed containers, it remained stable. On application as a joint sealant, it became exposed to light and to atmospheric oxygen and a vulcanizing process gradually proceeded. As previously stated, it is postulated that the presence of a halogen in the polymer chain plus the presence of oxygen would cause the formation of a macro radical near the bromine positions. There is another possible method by which this vulcanization proceeds. It is well known that unsaturated halides can be polymerized even without the presence of free radicals by irradiation with ultra-violet light. The photochemical activity is initiated by light attacking the halogen linkage and then the crosslinking proceeds at two points: (1) adjacent to the reactive halogen position, and (2) through the double bonds.

The invention is further illustrated by the following example:

EXAMPLE

A light gray sealant was prepared in a heavy duty mixer by dissolving

| | Pounds |
|---|---|
| Chlorinated 95% isobutylene-5% isoprene copolymer containing 1.2% chlorine | 123.1 |
| Mineral spirits | 123.1 |

The following ingredients were then blended into the solution while mixing was continued:

| | Pounds |
|---|---|
| Alkali refined linseed oil | 67.0 |
| Cobalt naphthenate solution (6%) in mineral spirits | 0.2 |
| Aluminum paste | 6.0 |
| Polyisobutylene | 193.0 |
| Titanox RCHTX (30% rutile; 70% calcium sulfate and containing a minimum of 29.5% $TiO_2$) | 39.8 |
| Powdered calcium carbonate | 468.9 |
| Asbestos fibre | 26.8 |
| Talc | 200.9 |

Mixing was completed within one hour. The product had a volatile content of 9.86% by weight and a density of 12.19 lbs./gal.

The proportions of the components of the composition may be varied somewhat. For best results, the halogenated butyl rubber should constitute between about 10 and 15%; the drying oil should constitute between about 3 and 8%; and the non-reactive plasticizer should be present in amounts between about 10 and 20%, said proportions being expressed on the weight of the total composition.

It is desirable to have a maximum percentage of the halogenated butyl rubber for ultimate properties. However, a high level of rubber would create difficulties in formulating a workable composition. It would also introduce a higher level of solvent. It is necessary to keep the drying oil to a lower level to minimize skin formation in the container, to minimize yellowing characteristics, and to minimize through-hardening of the applied material. The drying oil is basically necessary to form a quick skin on the surface of the applied material. The plasticizer levels keep the composition soft and distensible for a maximum time period.

The sealants of this invention are based on a blend of components for sealing joints having a space greater than ¼ inch and where a tight seal is required. They set to touch in approximately 24 hours after application at 77° F. and 50% humidity, and remain flexible within a surface temperature range —20° F. to 200° F. They provide a tight seal between clean surfaces, such as glass, aluminum, steel, plastic, marble, vinyl membrane and other construction or water-proofing materials and are especially suitable for use where tenacious adhesion, excellent weathering and outstanding sealing qualities are required under various circumstances. They allow little heat or electrical conductivity with minimum shrinkage. Being a one-component material, the sealants are not subject to pot life and have excellent container stability. They may be easily coated with paint within a few days if a change in color is desired.

I claim:

1. A sealing composition comprising between about 10 and 15% of halogenated rubbery copolymer containing a major amount of isobutylene copolymerized with up to about 5% by weight of a diolefin, said copolymer containing between about 1.0 and 1.3 weight percent of combined halogen selected from the group consisting of chlorine and bromine, between about 3 and 8% of a drying oil selected from the group consisting of a naturally-occurring unsaturated fatty oil and polybutadiene, and between about 10 and 20% of liquid polyisobutylene, said proportions being based on the weight of the total composition.

2. A composition according to claim 1 wherein the halogenated rubbery copolymer is chlorinated isobutylene-isoprene.

3. A composition according to claim 1 wherein the drying oil is linseed oil.

4. A sealing composition comprising 123.1 parts by weight of a chlorinated 95% isobutylene-5% isoprene copolymer containing 1.2% chlorine, 67 parts by weight of linseed oil and 193 parts by weight of liquid polyisobutylene.

References Cited
UNITED STATES PATENTS

| | | | |
|---|---|---|---|
| 2,402,189 | 6/1946 | Soday | 260—23.7 |
| 2,451,865 | 10/1948 | O'Brien | 260—23 |
| 2,956,972 | 10/1960 | Sterling | 260—23.7 |
| 2,964,493 | 12/1960 | Hakals et al. | 260—45.8 |
| 3,050,497 | 8/1962 | Young | 260—897 |
| 3,076,777 | 2/1963 | Zolla et al. | 260—33.6 |
| 3,169,566 | 2/1965 | Ziarnik | 152—330 |
| 3,320,333 | 5/1967 | Battline | 260—846 |
| 3,342,789 | 9/1967 | Bannister et al. | 260—79.5 |

DONALD E. CZAJA, *Primary Examiner.*

R. A. WHITE, *Assistant Examiner.*